United States Patent
Mottram et al.

(10) Patent No.: US 10,997,336 B1
(45) Date of Patent: May 4, 2021

(54) SYSTEMS AND METHODS FOR SYNTHESIZING A CIRCUIT ARCHITECTURE FOR DIVISION BY CONSTANTS

(71) Applicant: CADENCE DESIGN SYSTEMS, INC., San Jose, CA (US)

(72) Inventors: Edward Mottram, Cambridge (GB); Matthew David Eaton, Cambridge (GB)

(73) Assignee: Cadence Design Systems, Inc., San Jose, CA (US)

( * ) Notice: Subject to any disclaimer, the term of this patent is extended or adjusted under 35 U.S.C. 154(b) by 168 days.

(21) Appl. No.: 16/181,533

(22) Filed: Nov. 6, 2018

(51) Int. Cl.
*G06F 30/327* (2020.01)
*G06F 111/04* (2020.01)
*G06F 111/20* (2020.01)

(52) U.S. Cl.
CPC ........ *G06F 30/327* (2020.01); *G06F 2111/04* (2020.01); *G06F 2111/20* (2020.01)

(58) Field of Classification Search
CPC ............................ G06F 30/327; G06F 2111/04
USPC ....................................................... 716/102
See application file for complete search history.

(56) References Cited

U.S. PATENT DOCUMENTS

| | | | | |
|---|---|---|---|---|
| 6,060,936 A | * | 5/2000 | Raghunath | G06F 7/535 327/356 |
| 6,094,669 A | * | 7/2000 | Mahurin | G06F 7/535 708/655 |
| 8,312,361 B2 | * | 11/2012 | Kamoshida | G06F 7/535 714/799 |
| 2014/0059106 A1 | * | 2/2014 | Shinomiya | G06F 7/52 708/650 |

\* cited by examiner

*Primary Examiner* — Suchin Parihar
(74) *Attorney, Agent, or Firm* — Foley & Lardner LLP

(57) ABSTRACT

For a division of a dividend by a constant divider, a circuit architecture may calculate partial remainders. The circuit architecture may implement a tree structure to generate intermediate signals of partial remainders and combine adjacent intermediate signals to generate other partial remainders downstream. The circuit architecture may generate a quotient based on the partial remainders. The circuit architecture may also implement bit shifting and zero-padding on left side of the dividend to generate bit-level partial remainders. Furthermore, the circuit architecture may enable a fast round-to-zero division of signed integers by flipping the input bits of a negative integer and output bits of the corresponding quotient and performing only one increment operation, either before the division or after the division. In addition, the circuit architecture may also perform a division of a dividend in a carry-save form.

17 Claims, 9 Drawing Sheets

700

US 10,997,336 B1

SYSTEMS AND METHODS FOR SYNTHESIZING A CIRCUIT ARCHITECTURE FOR DIVISION BY CONSTANTS

TECHNICAL FIELD

This application relates generally to logic synthesis of integrated circuits and more specifically to synthesizing a fast architecture for division by constants.

BACKGROUND

Modern semiconductor based integrated circuits (ICs) are incredibly complex and contain millions of circuit devices, such as transistors, and millions of interconnections between the circuit devices. Designing such complex circuits cannot be accomplished manually, and circuit designers use computer based Electronic Design Automation (EDA) tools for synthesis, schematics, layouts, simulation, and verification of the complex circuits.

A significant function of an EDA tool is logic synthesis, where the EDA tool receives a high level description of the IC design in a hardware description language (HDL) and synthesizes a gate level design based on the high level description. In other words, the EDA tool during a logic synthesis phase converts a functional description of an IC design into circuit architectures (e.g., combination of circuit components and interconnections between the circuit components) that provide the functionality specified in the functional description of the IC design.

A common arithmetic functionality provided by an IC is a division of a dividend by a divisor to generate a quotient and a remainder. Therefore, a high level description of the IC may have multiple instances of a division functionality that the EDA tool has to synthesize corresponding circuit architectures. Many of these divisions may include a constant divisor, especially in a graphics processing unit (GPU) implementing pixel addressing, where majority of graphics data may arrive in blocks of three or five individual data records. The circuit architecture for division by constant may occur in critical path or near critical path of the ICs, especially GPUs.

Division of constants using the conventional circuit architecture is slow and cumbersome. Furthermore, the conventional circuit architecture may have a larger silicon footprint in the expensive real-estate of an IC. A larger footprint also means a higher power consumption, which is not desired in this day and age where electronic devices are increasingly mobile and untethered to a wall-outlet. For example, using conventional "radix-2 non restoring" or "radix-4 non-restoring" division architectures for a dividend having N bits incurs a delay in the order of $O(Nlog_2N)$ and takes up an area in the order of $O(N^2 log_2N)$ There may also smaller architectures with an area in an order of $O(N^2)$, but these architectures also have a longer delay in the order of $O(N^2)$.

As such, a significant improvement upon circuit architecture for division is required.

SUMMARY

What is therefore desired are circuit architectures for division by constants that are faster and occupy a smaller area compared to the conventional circuit architectures. What is further desired are systems and methods that synthesize faster and smaller circuit architectures for division by constants.

Embodiments disclosed herein solve the aforementioned technical problems and may provide other benefits as well. For a division of a dividend by a constant divider, an illustrative circuit architecture may calculate partial remainders incurring a delay in the order of $O(log_2N)$ and taking up the silicon area in the order of $O(Nlog_2N)$. This delay of $O(log_2N)$ is significantly less than the delay incurred by propagating constants even through smaller architectures (e.g., in the order of $O(N^2)$), which results in a delay in the order of $O(N^2)$. The circuit architecture may implement a tree structure to generate intermediate signals of partial remainders and combine adjacent intermediate signals to generate other partial remainders downstream. The circuit architecture may generate a quotient based on the partial remainders. Because the partial remainders can be calculated in parallel, the circuit architecture is significantly faster than conventional division architectures. The circuit architecture may also implement bit shifting and zero-padding on left side of the dividend for division by even numbers. Furthermore, the circuit architecture will enable a fast round-to-zero division of signed integers by flipping the input bits of a negative integer and output bits of the corresponding quotient and performing only one increment operation, either before the division or after the division. In addition, the circuit architecture may also perform a division of a dividend in a carry-save form.

In an embodiment, computer implemented method comprises receiving, by a computer, a hardware description file of an integrated circuit, wherein one or more data records in the hardware description file indicate a division functionality associated with a dividend and a constant divisor; generating, by the computer, a circuit architecture for the division functionality, wherein the circuit architecture is configured to utilize a tree structure to generate a set of intermediate signals carrying a first set of partial remainders and combine adjacent intermediate signals in the set of intermediate signals to generate a second set of partial remainders, wherein the circuit architecture is further configured to generate a quotient for the division functionality based upon the first and second sets of partial remainders and the digits of the dividend; and integrating, by the computer, the circuit architecture into a design file of the integrated circuit.

In another embodiment, a system comprises a non-transitory storage medium storing a hardware description file of an integrated circuit, wherein one or more data records in the hardware description file indicate a divisional functionality associated with a signed dividend and a divisor; a processor coupled to the non-transitory storage medium and configured to: generate a circuit architecture for the divisional functionality, wherein the circuit architecture is configured to: in response to the circuit architecture determining that the most significant bit of the dividend is one, replace in the dividend, zeroes with ones and ones with zeros; utilize a tree structure to generate a set of intermediate signals carrying a first set of partial remainders; combine adjacent intermediate signals in the set of intermediate signals to generate a second set of partial remainders; generate a quotient for the division functionality based upon the first and second sets of partial remainders and the digits of the dividend; in response to the circuit architecture determining that the most significant bit of the dividend is one, replace in the quotient, zeroes with ones and ones with zeros; and integrate the circuit architecture into a design file of the integrated circuit.

In yet another embodiment, a computer readable non-transitory medium comprises one or more computer instructions, which when executed by a processor cause the processor to: receive a hardware description file of an integrated circuit, wherein one or more data records in the hardware description file indicate a division functionality associated with a dividend in a carry-save form and a constant divisor; generate a circuit architecture for the division functionality configured to: utilize a tree structure to generate a set of intermediate signals from a combination of the carry portion and the save portion of the dividend in the carry-save form, the set of intermediate signals carrying a first set of partial remainders combine adjacent intermediate signals in the set of intermediate signals to generate a second set of partial remainders, generate a quotient for the division functionality based upon the first and second sets of partial remainders and an indication of a carry out; and integrate the circuit architecture into a design file of the integrated circuit.

BRIEF DESCRIPTION OF THE DRAWINGS

The accompanying drawings constitute a part of this specification and illustrate embodiments of the subject matter disclosed herein.

DETAILED DESCRIPTION

Figure 1:
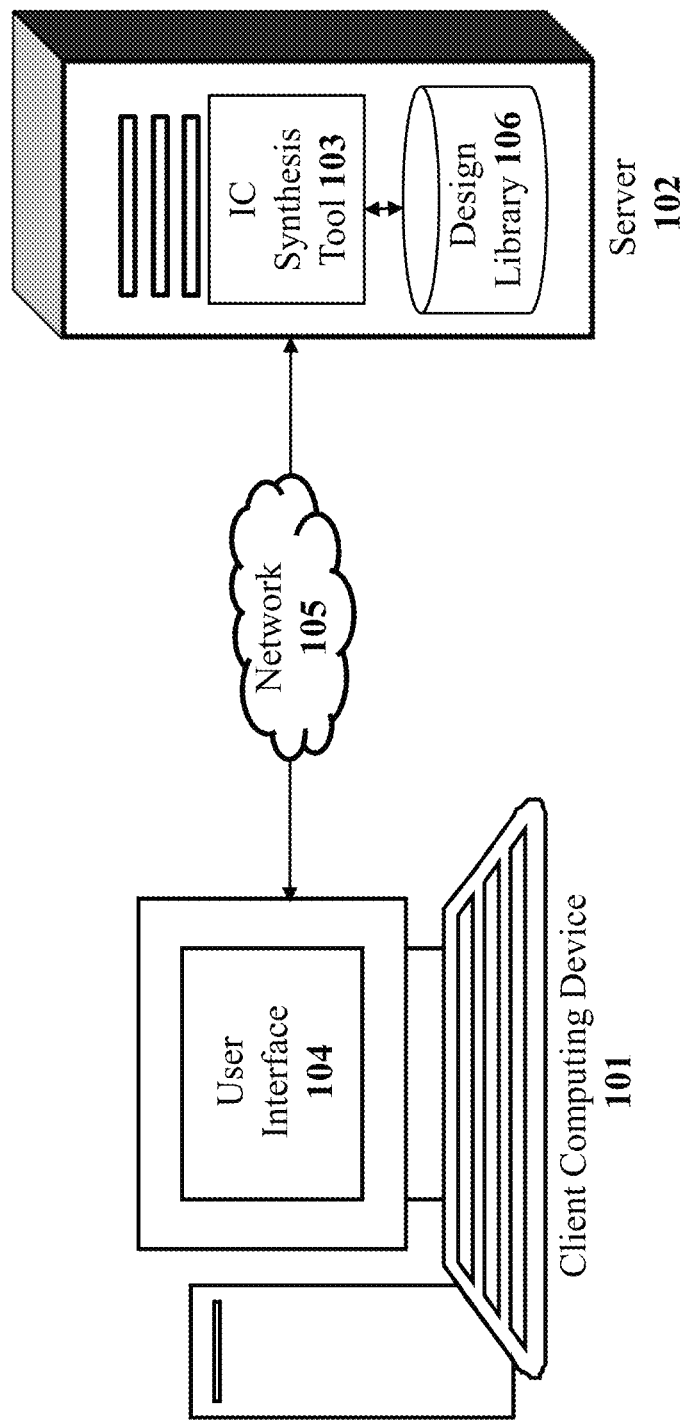
FIG. 1 shows an illustrative system for generating a circuit architecture for a division by constant, according to an embodiment.

Reference will now be made to the illustrative embodiments illustrated in the drawings, and specific language will be used here to describe the same. It will nevertheless be understood that no limitation of the scope of the claims or this disclosure is thereby intended. Alterations and further modifications of the inventive features illustrated herein, and additional applications of the principles of the subject matter illustrated herein, which would occur to one ordinarily skilled in the relevant art and having possession of this disclosure, are to be considered within the scope of the subject matter disclosed herein. The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

FIG. 1 shows an electronic design automation (EDA) system 100, according to an illustrative embodiment. The EDA system 100 may include any number of computing devices; the illustrative embodiment may include a client computing device 101 and a server 102. One or more components of the electronic design automation system 100 may be grouped and referred to as an electronic design automation tool (or EDA tool). The client 101 may be connected to the server 102 via hardware and software components of one or more networks 105. A network 105 may also connect various computing devices with databases or other components of the system 100. Examples of the network 105 include, but are not limited to, Local Area Network (LAN), Wireless Local Area Network (WLAN), Metropolitan Area Network (MAN), Wide Area Network (WAN), and the Internet. The communication over the network 105 may be performed in accordance with various communication protocols, such as Transmission Control Protocol and Internet Protocol (TCP/IP), User Datagram Protocol (UDP), and IEEE communication protocols.

A client computing device 101 may be any computing device comprising a processor/microcontroller and/or any other electronic component that performs one or more operations according to one or more programming instructions. The examples of the computing device may include, but are not limited to, a desktop computer, a laptop, a personal digital assistant (PDA), a smartphone, a tablet computer, and the like. The client computing device 101 may be configured to communicate with the one or more servers 102 of the system 100 through one or more networks 105, using wired and/or wireless communication capabilities. A user interface 104 in the client computing device 101 may include a Graphical User Interface (GUI) that presents an interactive, graphical representation of an IC design, layout, schematic, or other logical representation of an IC that is being synthesized, designed, optimized, and verified using an IC synthesis tool 103. For example, the GUI 104 may provide an interface for a designer to provide and edit functional specifications of an IC using a hardware description language such as VHDL or Verilog. Furthermore, the GUI 104 may provide interactive elements such as buttons or icons for the user to enter and/or modify the functional specifications written in the hardware description language. The designer may also use the GUI 104 to provide synthesis commands to the system, which may be text based commands or graphical commands such as a click of a button.

As described above, the server 102 may be accessible to the client device 101 via one or more networks 105. The server 102 may be any computing device comprising a processor and other computing hardware configured to execute an IC synthesis tool 103 software module (e.g., EDA synthesis software) that may generate a gate level design from a hardware level description of the design written in, e.g., VHDL or Verilog. In operation, using a client device 101 to access a synthesis tool 103 hosted on a server 102 over a network 105, a circuit designer may interact with the IC synthesis tool 103, through a number of input devices of the client device 101, such as by inputting a selection as with a mouse or inputting a request as with a keyboard. The IC synthesis tool 103 may generate any number of graphical interface 104 responses based on the inputs received from the client device 101, and then send the data back to the client device 101 to be presented on the GUI 104.

The server 102 may include a design library 106 that is accessed by the IC synthesis tool 103. The design library 106 may include instances of various circuit devices used to design an IC. Non-limiting examples of circuit devices may include memory devices (e.g., D flip-flops, T flip-flops, SR flip flops, JK flip flops), combination logic gates (e.g., AND, OR, NOT, NOR, NAND, XOR), and multiplexers, among others. In some embodiments, the design library 106 may include instances of pcells used by the IC synthesis tool 103 to generate an IC design. An instance of a pcell may represent electronic circuit components such as a transistor, transmission line, or an optical fiber line. The IC synthesis tool 103 may use instances of pcells or any other types of design instances in the design library 106 to generate a netlist of an IC that can be sent to a manufacturing facility for fabrication.

The exemplary system 100 is shown in FIG. 1 as comprising only one server 102 for ease of explanation. However, it should be appreciated that the system 100 may comprise a number of servers 102. In some embodiments, the system 100 may comprise multiple interconnected, networked servers 102, some of which may execute various software modules configured to manage and control the resources and performance of the system 100. In some embodiments, the servers 102 may have parallel architectures configured to support multi-threading on multi-core workstations to handle large designs. In such embodiments, the servers 102 may be configured for distributed processing. The server 102 may be logically and physically organized within the same or different devices or structures, and may be distributed across any number of physical structures and locations (e.g., cabinets, rooms, buildings, cities). Furthermore, the system 100 with the IC synthesis tool 103 and the design library 106 located at the server 102 is merely for illustration and one or more of the IC synthesis tool 103 and the design library 106 may be within the client computing device 100.

In operation, the system 100 may receive one or more hardware description files (e.g., VHDL or Verilog) containing functional specification of an IC. The functional specification of the IC may indicate instances of a division functionality associated with a dividend and a divisor. In some embodiments, the divisor may be a constant, e.g., where the IC is a GPU having pixel addressing functionality. The IC synthesis tool 103 may generate the corresponding circuit architectures for the division functionality, where the circuit architectures may calculate partial remainders in parallel and generate quotient based upon the partial remainders.

Figure 2:
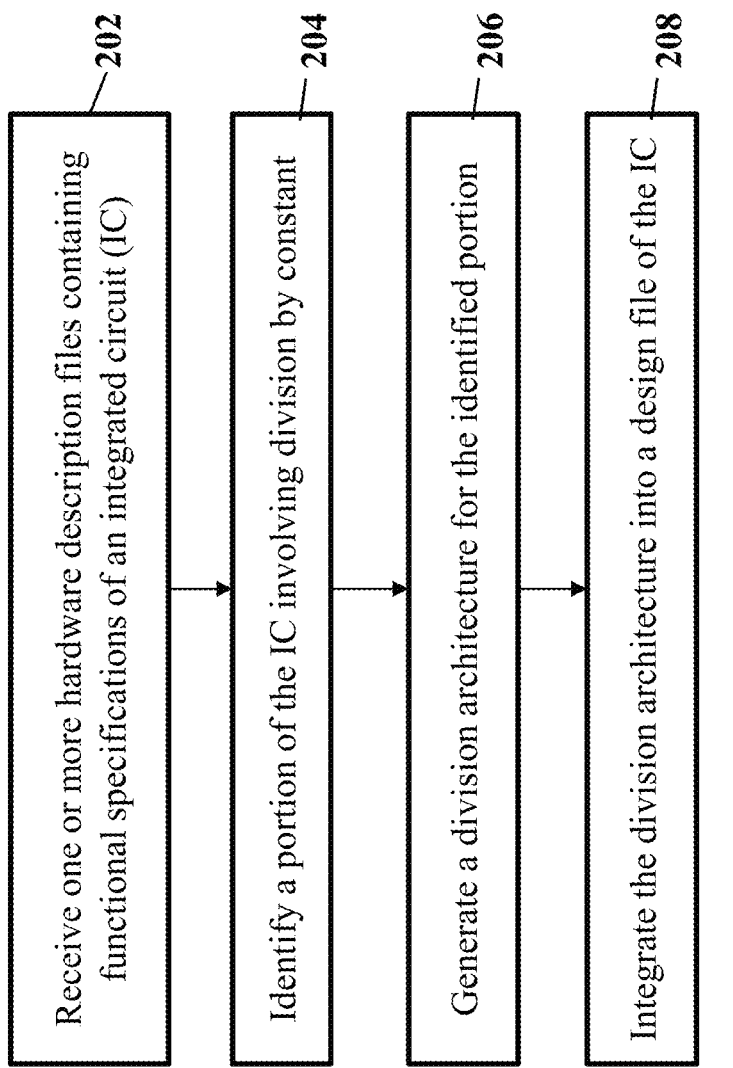
FIG. 2 shows a flow diagram of an illustrative method of generating a circuit architecture for a division by a constant, according to an embodiment.

FIG. 2 shows a flow diagram 200 of an illustrative method of generating division architecture. Although multiple computers and multiple databases may perform the steps of the method, the steps are shown as being implemented by a single computer. Furthermore, the steps shown are merely illustrative, and additional steps or alternative steps should be considered within the scope of this disclosure. In addition, one or more of the steps may be skipped during the implementation of the method.

At a first step 202, the computer may receive one or more hardware description files containing functional specifications of an integrated circuit (IC). The hardware description files may in different formats such as Verilog or VHDL (VHSIC Hardware Description Language). The computer may receive the hardware description files from different sources such as another computer, internet source, and/or file transfer.

At a next step 204, the computer may identify portions of the IC involving division by constant. For example, the computer may compile and analyze the data records of the one or more hardware description files to identify such portion. For instance, the one or more hardware description files may include computer program statements, routines, sub-routines, and/or modules that require a division by a constant.

At step 206, the computer may generate a division architecture for the identified portion. The compute may configure the division architecture (also referred to as circuit architecture) to have the functionality described throughout this disclosure. At step 208, the computer may integrate the division architecture into a design file of the IC. In other words, the computer may synthesize the division architecture form the functional description in the hardware description files.

Figure 3:
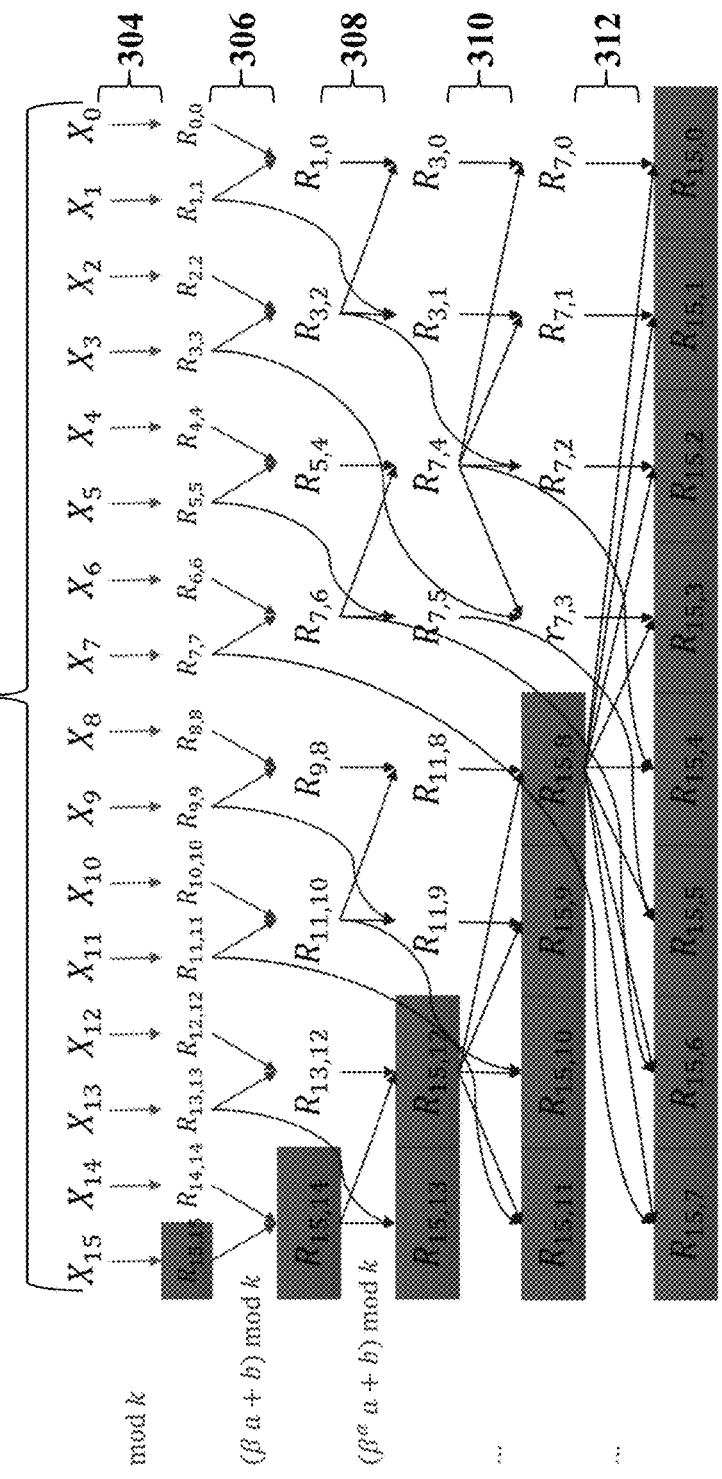
FIG. 3 shows a process diagram of an illustrative method utilizing a tree structure to generate partial remainders for the purpose of performing a division by constant, according to an embodiment.

FIG. 3 shows a process diagram 300 an illustrative method of generating partial remainders for the purpose of performing division by a constant, according to an embodiment. Although multiple computers and multiple databases may perform the steps of the method, the steps are shown as being implemented by a single computer. Furthermore, the steps shown are merely illustrative, and additional steps or alternative steps should be considered within the scope of this disclosure. In addition, one or more of the steps may be skipped during the implementation of the method. The computer may execute the method to generate a quotient of an unsigned integer using an illustrative circuit architecture that may be faster and may have a smaller silicon footprint than conventional circuit architectures.

For an unsigned integer $$x = \sum_{i=0}^{N-1} \beta^i X_i$$

for some base β (e.g., 2 for binary digits and 10 for decimal digits) and integer length N, one method is to calculate a quotient floor $$y = \sum_{i=0}^{N-1} \beta^i Y_i = \left\lfloor \frac{x}{k} \right\rfloor$$

one digit at a time. For each calculation, one can concatenate respective partial remainder up to i+1 position with the $i^{th}$ digit of x and divide the result by k. If partial remainders can be computed upfront, it may be possible to compute all the digits of the quotient in O(1) time.

In many circuits such as graphics processing units (GPUs), many critical portions include circuitry for dividing by constants. For example, the GPU may have to repeatedly divide a quantity by a constant such as 3 or 5 for pixel addressing. These constants may be expressed as $2^n \pm 1$ (e.g., $3=2^2-1$ and $5=2^2+1$). If the base β is expressed as $\beta=2^n$, the partial remainder to an $i^{th}$ digit may be x[MSB:n*i]% k, wherein MSB is an acronym for the most significant bit (the leftmost bit) of x and % is modulo operator (abbreviated as mod) that generates a remainder when a dividend (e.g., x[MSB:n*I]) is divided by a divisor (e.g., k). As described below, the computer may be able to calculate the partial remainders with $O(\log_2 N)$ delay and $O(N \log_2 N)$ area.

For example, if $\beta=2$, the partial remainders are in the form of $x[MSB: i]\% \ k$, and the $i^{th}$ bit of the quotient is 1 if $\{x[MSB:l+1] \ \% \ k, \ x[i]\} \geq k$ and 0 otherwise. Thus, the computer has signals for $x[MSB: i]\% \ k$ for each i, the computer may compute the quotient floor $$\left\lfloor \frac{x}{k} \right\rfloor$$

at a lower computation cost. It should be understood that the computer may trivially extend an architecture based on the above to division by $k=2^m(2^n \pm 1)$ by right shifting the input x by m bits. It should further be understood that the divisor $k=2^m(2^n \pm 1)$ is merely exemplary and should not be considered a limitation.

To calculate the partial remainders, e.g., by using a tree structure, the computer may receive a first input (dividend)

$$x[b:a] = \sum_{i=a}^{b} \beta^{i-a} X_i$$

and a second input (divisor) k. The computer may define a partial remainder $R_{N-i}$ after generating first i digits of the quotient $Y[N-1, N-i]$ as $R_{N-i}=X[N-1:N-i]-k*Y[N-1,N-i]$. For convenience, $R_N$ may be set to 0. The quotient up an $i^{th}$ digit $(Y_{N-i})$ may be defined as $$Y_{N-i} = \left\lfloor \frac{\beta R_{N-i+1} + X_{N-i}}{k} \right\rfloor$$

and the corresponding remainder may be defined as $R_{N-i}=R_{N-1,N-i}=X[N-1,N-i] \bmod k$. Furthermore, remainder from dividing the input from an $i^{th}$ position to a $j^{th}$ position may be defined as:

$$R_{i,j} = X[i:j] \bmod k$$
$$= (\beta^{a-j}X[i:a] + X[a-1:j]) \bmod k$$
$$= ((\beta^{a-j} \bmod k) * (X[i:a] \bmod k) + (X[a-1:j] \bmod k)) \bmod k$$
$$= ((\beta^{a-j} \bmod k) R_{i,a} + R_{a-1,j}) \bmod k$$

When $k=2^n \pm 1$ and b is a multiple of n, the identity $$R_{i,j}=((\beta^{a-j} \bmod k) R_{i,a}+R_{a-1,j}) \bmod k$$

reduces to $$R_{i,j}=(R_{i,a} \pm R_{a-1,j}) \bmod k$$

because $2^{n(a-j)} \bmod k=\pm 1$.

Thus, if the computer retrieves signals $x[n-1:0]\% \ k$, $x[2*n-1:n]\% \ k, \ldots, x[N*n-1:(N-1)*n]\% \ k$, the computer may combine each of the adjacent signals together to generate $x[MSB:n*i]\% \ k$ for each i as required.

During the execution of the process, the computer may generate partial remainders when a 16 digit unsigned integer 302 of any base (e.g., binary or decimal) is divided by an integer k based on the principles described above. At a first step 304, the computer may calculate remainders $R_{i,i}$ for the respective digits $X_i$ of the integer 302 by performing a modulo operation $R_{i,i}\% \ k$. In particular the computer may perform the following operations: (1) $R_{15,15}=X_{15}\% \ k$, (2) $R_{14,14}=X_{14}\% \ k$, (3) $R_{13,13}=X_{13}\% \ k$, (4) $R_{12,12}=X_{12}\% \ k$, (5) $R_{11,11}=X_{11}\% \ k$, (6) $R_{10,10}=X_{10}\% \ k$, (7) $R_{9,9}=X_9\% \ k$, (8) $R_{8,8}=X_8\% \ k$, (9) $R_{7,7}=X_7\% \ k$, (10) $R_{6,6}=X_6\% \ k$, (11) $R_{5,5}=X_5\% \ k$, (12) $R_{4,4}=X_4\% \ k$, (13) $R_{3,3}=X_3\% \ k$, (14) $R_{2,2}=X_2\% \ k$, (15) $R_{1,1}=X_1\% \ k$, and (16) $R_{0,0}=X_0\% \ k$. It should be understood that the size (16 bits) of the unsigned integer 302 is merely for illustrative and should not be considered limiting.

In a next step 306, the computer may perform modulo operations on the sum of adjacent partial remainders based upon the general expression $R_{i,j}=R_{i,a}+R_{a-1,j}\% \ k$. More specifically, the computer may perform the following modulo operations: (1) $R_{15,14}=(R_{15,15}+R_{14,14})\% \ k$, (2) $R_{13,12}=(R_{13,13}+R_{12,12})\% \ k$, (3) $R_{11,10}=(R_{11,11}+R_{10,10})\% \ k$, (4) $R_{9,8}=(R_{9,9}+R_{8,8})\% \ k$, (5) $R_{7,6}=(R_{7,7}+R_{6,6})\% \ k$, (6) $R_{5,4}=(R_{5,5}+R_{4,4})\% \ k$, (7) $R_{3,2}=(R_{3,3}+R_{2,2})\% \ k$, and (8) $R_{1,0}=(R_{1,1}+R_{0,0})\% \ k$.

In a next step 308, the computer may perform modulo operations on the partial remainders generated in the previous steps based on the general expression $R_{i,j}=(R_{i,a}+R_{a-1,j})\% \ k$. More specifically, the computer may perform the following modulo operations: (1) $R_{15,13}=(R_{15,14}+R_{13,13})\% \ k$, (2) $R_{15,12}=(R_{15,14}+R_{13,12})\% \ k$, (3) $R_{11,9}=(R_{11,10}+R_{9,9})\% \ k$, (4) $R_{11,8}=(R_{11,10}+R_{9,8})\% \ k$, (5) $R_{7,5}=(R_{7,6}+R_{5,5})\% \ k$, (6) $R_{7,4}=(R_{7,6}+R_{5,4})\% \ k$, (7) $R_{3,1}=(R_{3,2}+R_{1,1})\% \ k$, and (8) $R_{3,0}=(R_{3,2}+R_{1,0})\% \ k$.

In a next step 310, the computer may perform modulo operations on the partial remainders generated in the previous steps based on the general expression $R_{i,j}=(R_{i,a}+R_{a-1,j})\% \ k$. More specifically, the computer may perform the following modulo operations: (1) $R_{15,11}=(R_{15,12}+R_{11,11})\% \ k$, (2) $R_{15,10}=(R_{15,12}+R_{11,10})\% \ k$, (3) $R_{15,9}=(R_{15,12}+R_{11,9})\% \ k$, (4) $R_{15,8}=(R_{15,12}+R_{11,8})\% \ k$, (5) $R_{7,3}=(R_{7,4}+R_{3,3})\% \ k$, (6) $R_{7,2}=(R_{7,4}+R_{3,2})\% \ k$, (7) $R_{7,1}=(R_{7,4}+R_{3,1})\% \ k$, and (8) $R_{7,0}=(R_{7,4}+R_{3,0})\% \ k$.

In a next step 312, the computer may perform modulo operations on the partial remainders generated in the previous steps based on the general expression $R_{i,j}=(R_{i,a}+R_{a-1,j})\% \ k$. More specifically, the computer may perform the following modulo operations: (1) $R_{15,7}=(R_{15,8}+R_{7,7})\% \ k$, (2) $R_{15,6}=(R_{15,8}+R_{7,6})\% \ k$, (3) $R_{15,5}=(R_{15,8}+R_{7,5})\% \ k$, (4) $R_{15,4}=(R_{15,8}+R_{7,4})\% \ k$, (5) $R_{15,3}=(R_{18,8}+R_{7,3})\% \ k$, (6) $R_{15,2}=(R_{15,8}+R_{7,2})\% \ k$, (7) $R_{15,1}=(R_{15,8}+R_{7,1})\% \ k$, and (8) $R_{15,0}=(R_{15,8}+R_{7,0})\% \ k$.

Although aforementioned steps describe modulo operations on a sum of partial remainders, it should be understood that the computer may perform modulo operations on the difference of (e.g., a first partial remainder subtracted from a second partial remainder) or toggle between performing modulo operations on the sum of and the difference between the partial remainders. The modulo operations on the sum of the partial remainders are shown for illustrative purposes only. It should further be understood that the computer may perform modulo operations on the partial remainders in parallel (or concurrently), as described below.

As described above, by executing the steps 304, 306, 308, 310, 312, the computer may generate partial remainders in each step. In other words, the computer may generate $x[MSB: n*i]\% \ k$. All of these operations are on $O(\log_2 N)$ levels of logic. The algorithm of the steps 304, 306, 308, 310, 312 executed by the computer to generate the partial remainder can also be described as follows. As described herein, uppercase letters are used to represent numbers in base $\beta$ and lowercase letters are used to represent numbers in base 2.

Once the computer fixes the constant divisor $k=2^n\pm 1$ and the base $\beta=2^n$, the computer may obtain an N-digit dividend $X_i$ from $x=x[x\_width-1:0]$ via bit slicing, where $X_i=x[n(i+1)-1:ni]$. Having $X_i$, the computer may generate the remainders, $R_i=X[N-1:i]$ mod k by filling in parts of the mod array $R_{i,j}=X[i:j]$ mod k, as shown in the illustrative algorithm below:

1. Find the least $\alpha$ such that $2^\alpha \geq N$, where $N=\lceil x\_width/n \rceil$. Pad x with zeros so that it has bit-width $n2^\alpha$.
2. Assign $R_{i,i}=X_i$ mod $k=x[n(i+1)-1:ni]$mod k for each $0 \leq i \leq 2^\alpha$, where $R_{i,i}=x[n(i+1)-1:ni]$ except in the case where $x[n(i+1)-1:ni]=\{1, \ldots, 1\}$ and $k=2^N-1$. In this case $R_{i,i}=\{0, \ldots, 0\}=0$.
3. For signed dividend $s=2, 4, 8, \ldots, 2^{\alpha-1}$: (method steps detailed in FIG. 5 below)

For $t = 0, s, 2s, \ldots, 2^\alpha - s$:

For $u = 0, 1, 2, \ldots, \frac{s}{2} - 1$:

Assign $r_{t+z-1, t+u} = \left(\beta^{\frac{z}{2}-u} R_{t+s-1, t+\frac{s}{2}} + R_{t+\frac{s}{2}-1, t+u}\right) \bmod k$ It should be noted that $$\beta^{\frac{s}{2}-u} \bmod k$$

is 1 if $k=2^n-1$ or $k=2^n+1$ and $$\frac{z}{2}-u$$

is even, otherwise it is $-1$. This makes each of these assignments computationally cheap to implement. Furthermore, each of the assignment steps can be executed in parallel (or concurrently) because these steps on the values of $R_{i,j}$ that have been calculated for a pervious value of s. Therefore the delay incurred by the algorithm is $O(\alpha)=O(\log_2 N)$.

4. Finally, set $R_i=R_{2^\alpha-1,i}$ for each $0 \leq i \leq 2^\alpha$, and complete the division as described in the division algorithm below.

Based on the mod array $R_{i,j}$, the computer may execute the following division algorithm to generate the quotient:

1. For $k=2^n\pm 1$ the final division $$Y_i = y[n(i+1)-1:ni] = \left\lfloor \frac{\beta R_{i+1} + X_i}{k} \right\rfloor = \left\lfloor \frac{\{R_{i+1}; X_i\}}{k} \right\rfloor$$

is computationally cheap to compute because $Y_i$ can be deduced by comparing $R_{i+1}$ with $x_i=x[n(i+1)-1:ni]$:

a. If $k=2^n-1$ then $y[n(i+1)-1:ni]=Y_i=(R_{i+1}<X_i)?R_{i+1}:R_{i+1}+1$.

b. If $k=2^n-1$ then $y[n(i+1)-1:ni]=Y_i=(R_{i+1}>X_i)?R_{i+1}-1:R_{i+1}$.

2. However, if the remainder down to each bit is available in advance then the quotient can be produced even more quickly. For example, define $r_i=x[x\_width-1:i]$ mod k for each $0 \leq i < x\_width$, then each bit of the quotient $y=y[x\_width-1:0]$ can be generated by comparing $\{r_{i+1}, x[i]\}$ with k:

a. If $k=2^n-1$ then $y[i]=r_{i+1}[n-1] \& \{r_{i+1}[n-2:0], x[i]\}$.

b. If $k=2^n+1$ then $y[i]=r_{i+1}[n] | (r_{i+1}[n-1] \& !\{r_{i+1}[n-2:0], x[i]\})$.

Figure 4:
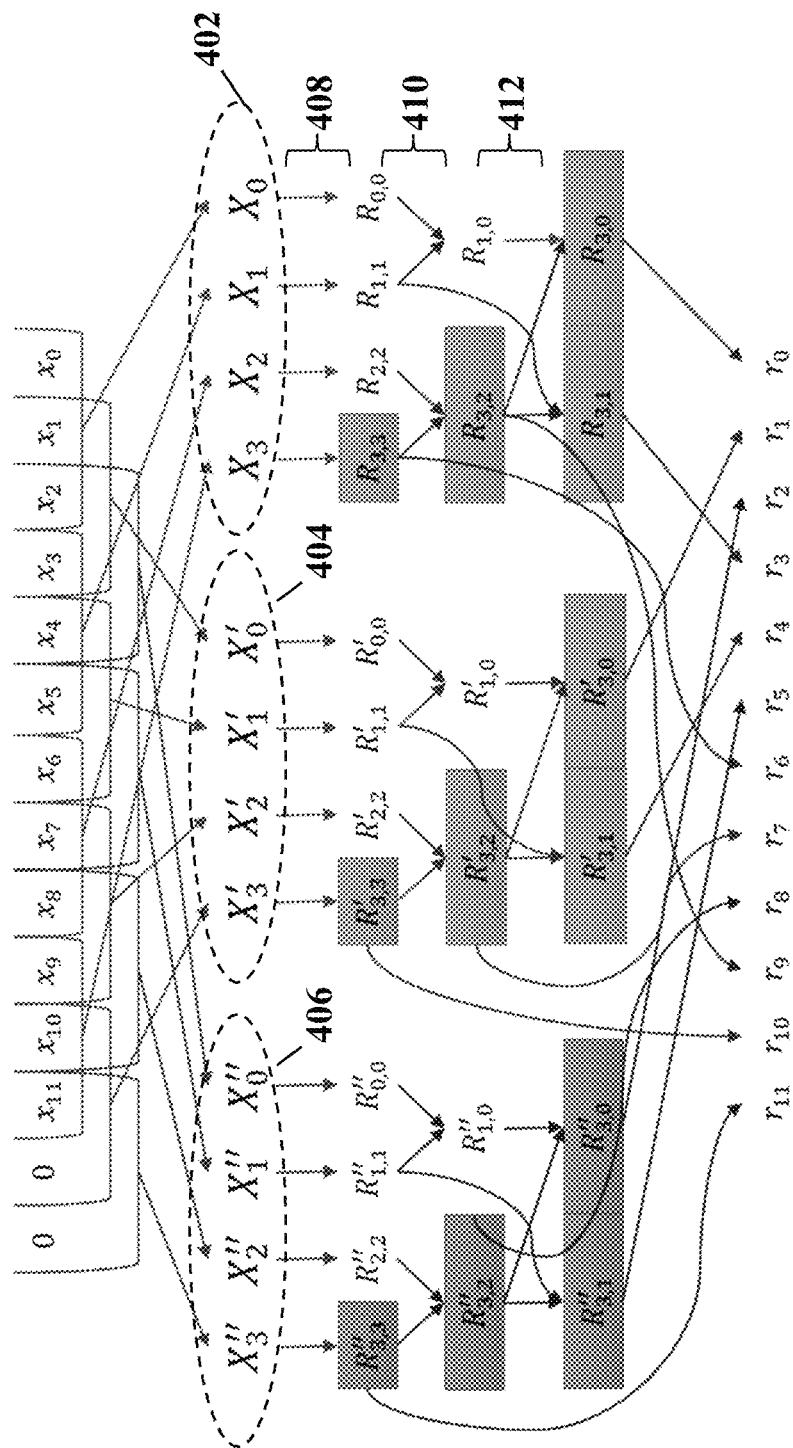
FIG. 4 shows a process diagram of an illustrative method utilizing a tree structure and zero-padding on the dividend to generate bit-level remainders for the purpose of performing a division by constant, according to an embodiment.

Obtaining the $r_i$ can be achieved by reproducing n copies of the remainder array with the bit-offset inputs $x, x>>i, \ldots, x>>n-1$. (e.g., FIG. 4 shows an example for 12-bit division by $k=9=2^3+1$).

Figure 7:
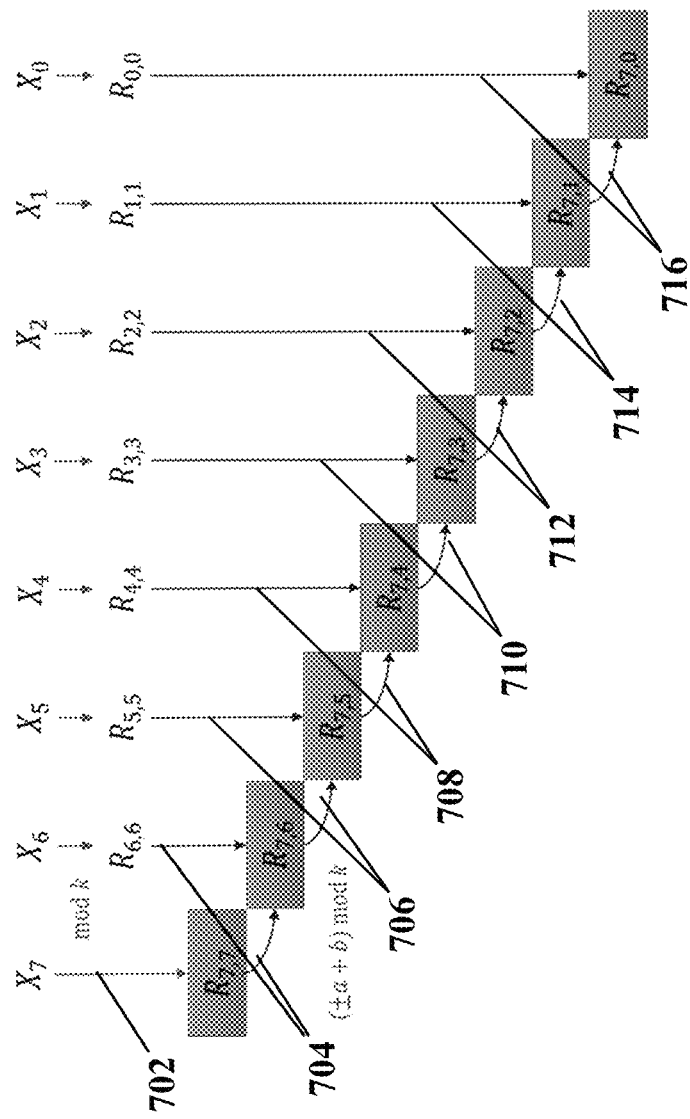
FIG. 7 shows a process diagram of an illustrative method of sequential calculations of partial remainders for the purpose of performing a division by constant, according to an embodiment.

3. On the other hand, by using the identity $R_{i-1}=(\beta R_i + X_{i-1})$ mod k for each i, the computer may calculate the $R_{N,i}$ sequentially (as shown in FIG. 7, a process diagram 700 with sequential steps 702, 704, 706, 708, 710, 712, 714, 716). The architecture shown in the process diagram 700 may have a reduced area in the order of O(N) rather than $O(N \log_2 N)$ but may have an increased delay in the order of O(N) rather than $O(\log_2 N)$.

The computer may also be able to calculate partial remainders down to each bit by zero padding the input x and use n instances of the of the tree structure (e.g., shown in FIG. 3) to reduce $x[MSB: 0]$, $x[MSB+1:1], \ldots, x[MSB+n:n-1]$ to the partial remainders $x[MSB:n*i]\% k$, $x[MSB:n*i+1]\% k, \ldots, x[MSB:n*i+n-1]\% k$. For example, FIG. 4 shows an illustrative process diagram 400 of an illustrative method for generating partial remainders at a bit level. Although multiple computers and multiple databases may perform the steps of the method, the steps are shown as being implemented by a single computer. Furthermore, the steps shown are merely illustrative, and additional steps or alternative steps should be considered within the scope of this disclosure. In addition, one or more of the steps may be skipped during the implementation of the method.

As shown, an input 402 may include four three-bit digits $X_3, X_2, X_1, X_0$. Each of the three-bit digits may contain their respective bits as follows: (1) $X_3$: $x_{11}, x_{10}, x_9$, (2) $X_2$: $x_8, x_7, x_6$; (3) $X_1$: $x_5, x_4, x_3$; and (4) $X_4$: $x_2, x_1, x_0$. Here, $k=9$, i.e., the computer may divide the input 402 by 9. Therefore, based upon the formulation of k above as $k=2^n+1$, $2^n=k-1=8$, and $n=3$. The computer may then, using the zero padding of the input 402 may generate three instances (for $n=3$) of the tree structure for the partial remainders. The first instance may be based upon the input 402.

The computer may generate a second instance for a bit-shifted input 404 obtained by bit-shifting the input 402 by one bit to the left. Similarly, the computer a third instance for a bit-shifted input 406 obtained by bit-shifting the input 402 by two bits to the left. It should be understood that the computer utilizes the padded zeros to generate the bit-shifted inputs 404, 406. Bit-shifted input 404 may include four digits $X'_3, X'_2, X'_1, X'_0$, with the following assignment of bits: (1) $X'_3$: 0, $x_{11}, x_{10}$; (2) $X'_2$: $x_9, x_8, x_7$; (3) $X'_1$: $x_6, x_5, x_4$; and (4) $X'_0$: $x_3, x_2, x_1$. Similarly, bit-shifted input 406 may include four digits $X''_3, X''_2, X''_1, X''_0$, with the following assignment of bits: (1) $X''_3$: 0, 0, $x_{11}$; (2) $X''_2$: $x_{10}, x_9, x_8$; (3) $X''_3$: $x_7, x_6$; $x_5$; and (4) $X''_0$: $x_4$ $x_3$ $x_2$.

In step 408, the computer may calculate partial remainders for all the digits for each of the inputs 402, 404, 406. For the input 402 containing the digits $X_3, X_2, X_1, X_0$, the computer may generate the partial remainders (1) $R_{3,3}=X_3\% k$, (2) $R_{2,2}=X_2\% k$, (3) $R_{1,1}=X_1\% k$, and (4) $R_{0,0}=X_0\% k$. For the bit-shifted input 404 containing the digits $X'_3, X'_2, X'_1, X'_0$, the computer may generate the partial remainders (1) $R'_{3,3}=X'_3\% k$, (2) $R'_{2,3}=X'_2\% k$, (3) $R'_{1,1}=X'_1\% k$, and (4) $R'_{0,0}=X'_0\% k$. For the bit-shifted input 406 containing the digits $X''_3, X''_2, X''_1, X''_0$, the computer may generate the partial remainders (1) $R''_{3,3}=X''_3\% k$, (2) $R''_{2,3}=X''_2\% k$, (3) $R''_{1,1}=X''_1\% k$, and (4) $R''_{0,0}=X''_0\% k$.

In a next step 410, the computer may perform modulo operations on the partial remainders generated in step 408 based on the general expression $R_{i,j}=(R_{i,a}+R_{a-1,j})\% k$. For the first instance of the tree associated with the input 402, the computer may perform the following modulo operations (1) $R_{3,2}=(R_{3,3}=R_{2,2})\% k$ and (2) $R_{1,0}=(R_{1,1}=R_{0,0})\% k$. For the second instance of the tree associated with the bit shifted input 404, the computer may perform the following operations (1) $R'_{3,2}=(R'_{3,3}=R'_{2,2})\% k$ and (2) $R'_{1,0}=(R'_{1,1}=R'_{0,0})\% k$. For the third instance of the tree associated with the bit shifted input 406, the computer may perform the following operations (1) $R''_{3,2}=(R''_{3,3}=R''_{2,2})\% k$ and (2) $R''_{1,0}=(R''_{1,1}=R''_{0,0})\% k$.

In a next step 412, the computer may perform modulo operations on the partial remainders generated in the previous steps based on the general expression $R_{i,j}=(R_{i,a}+R_{a-1,j})\% k$. For the first instance of the tree associated with the input 402, the computer may perform the following modulo operations (1) $R_{3,1}=(R_{3,2}=R_{1,1})\% k$ and (2) $R_{3,0}=(R_{3,2}=R_{1,0})\% k$. For the second instance of the tree associated with the bit shifted input 404, the computer may perform the following operations (1) $R'_{3,1}=(R'_{3,2}=R'_{1,1})\% k$ and (2) $R'_{3,0}=(R'_{3,2}=R'_{1,0})\% k$. For the third instance of the tree associated with the bit shifted input 406, the computer may perform the following operations (1) $R''_{3,1}=(R''_{3,2}=R''_{1,1})\% k$ and (2) $R''_{3,0}=(R''_{3,2}=R''_{1,0})\% k$. Based on the partial remainders generated at steps 408, 410, 412, the computer may generate bit-level partial remainders $r_{11}$, $r_{10}$, $r_9$, $r_8$, $r_7$, $r_6$, $r_5$, $r_4$, $r_3$, $r_2$, $r_1$, $r_0$ based on the following correspondence relationship: (1) $r_{11}=R''_{3,3}$; (2) $r_{10}=R''_{3,3}$; (3) $r_9=R_{3,3}$; (4) $r_8=R''_{3,2}$; (5) $r_7=R''_{3,2}$; (6) $r_6=R_{3,2}$; (7) $r_5=R''_{3,1}$; (8) $r_4=R'_{3,1}$; (9) $r_3=R_{3,1}$; (10) $r_2=R''_{3,0}$; (11) $r_1=R'_{3,0}$; and (12) $r_0=R_{3,0}$.

Figure 5:
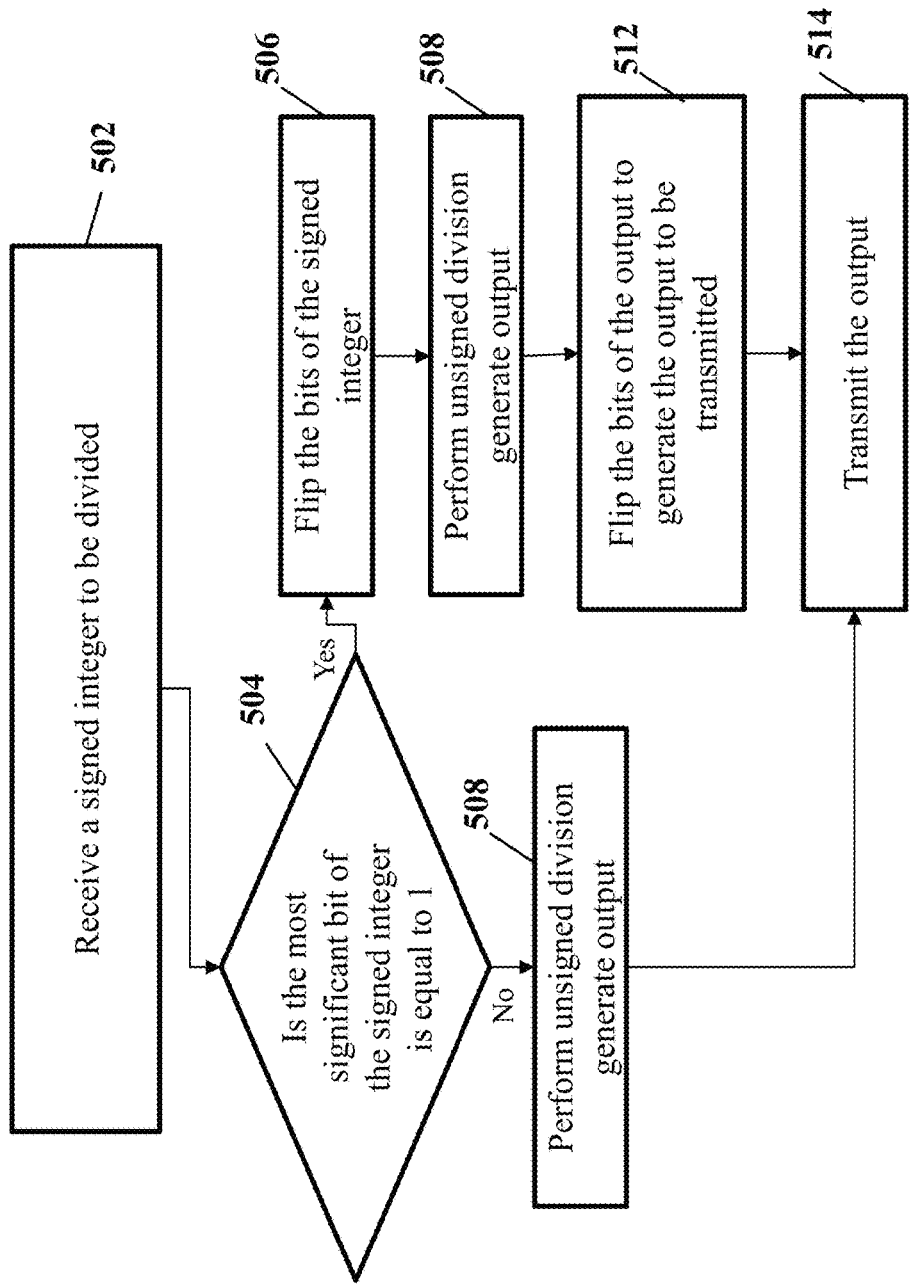
FIG. 5 shows a flow diagram of an illustrative method of performing a division of a signed integer, according to an embodiment.

FIG. 5 shows a flow diagram 500 of an illustrative method for dividing a signed integer using a circuit architecture generated by one or more embodiments disclosed herein. Although multiple computers and multiple databases may perform the steps of the method, the steps are shown as being implemented by a single computer. Furthermore, the steps shown are merely illustrative, and additional steps or alternative steps should be considered within the scope of this disclosure. In addition, one or more of the steps may be skipped during the implementation of the method.

For a twos-complement input x, the identify $\bar{x}=-x-1$ can be used to see that $$\left\lceil \frac{\bar{x}}{k} \right\rceil = -\left\lfloor \frac{-x-1}{k} \right\rfloor - 1 = -\left\lfloor \frac{-x+(k-1)}{k} \right\rfloor = \left\lceil \frac{x-(k-1)}{k} \right\rceil = \left\lfloor \frac{x}{k} \right\rfloor$$

Thus, to extend the circuit architecture for unsigned integers to signed integers, the computer may flip the input and output bits based on the most significant bit (MSB) of the input x. This processing can be expressed in a pseudo-code as:

$$s = x[MSB]?\ \bar{x}{:}x,$$
$$t = \left\lfloor \frac{s}{k} \right\rfloor,$$
$$y = x[MSB]?\ \bar{t}{:}t$$

where s indicates the input to the unsigned divider (e.g., the circuit architecture performing an unsigned division as shown in FIG. 3) and t indicates the result received from the unsigned divider.

The computer may execute the method 500 based upon the principles described above. At a first step 502, the computer may receive a signed integer to be divided. At a next step 504, the computer may determine whether the most significant bit of the signed integer is equal to 1. The most significant bit being 1 may indicate to the computer that the input integer is negative. If the computer determines that the most significant bit is 1 (indicating that the signed integer is negative), the computer may execute step 506 to flip the bits of the signed integer by replacing 0's with 1's and vice versa and perform an unsigned division on the flipped input at step 508. The computer may then execute step 512 to flip the bits of the generated output and transmit the output at step 514. However, if the computer determines that the most significant bit is 0 (indicating that the signed integer is positive), the computer may perform unsigned division at step 508 without flipping the bits of the signed integer and transmit the output at step 514.

It should be understood that by executing the above steps, the computer may round the output towards negative infinity. For example, the computer may round each of −24.01 and −24.65 to −25. Some hardware specification may indicate that the computer should round the output towards 0, e.g., each of −24.01 and −24.65 should be rounded to −24. To achieve rounding towards 0, the computer may choose from two approaches in conjunction with the method. In a first approach, the computer may add 1 to the quotient (y) whenever the input (x) is negative and the remainder is non-zero. In other words, the computer may post-add 1 to the quotient to round the quotient towards zero, where the result of the division being non-integer is indicated by the non-zero remainder. In a second approach, the computer may add k−1 to a negative x before the division.

Both of the approaches involve only one incrementor, either to the input in the pre-add approach or to the output in the post-add approach, compared to the traditional systems which use double negation identity $$\left\lceil \frac{x}{k} \right\rceil = -\left\lfloor \frac{-x}{k} \right\rfloor.$$

Traditional systems may perform first negation to generate a twos-complement of x that involves a first incrementor and a second negation to generate a twos-complement of the quotient that involves a second incrementor. It should also be understood that in the method there is no assumption that k is a constant and the method may be applicable to non-constant divisions as well.

Figure 6:
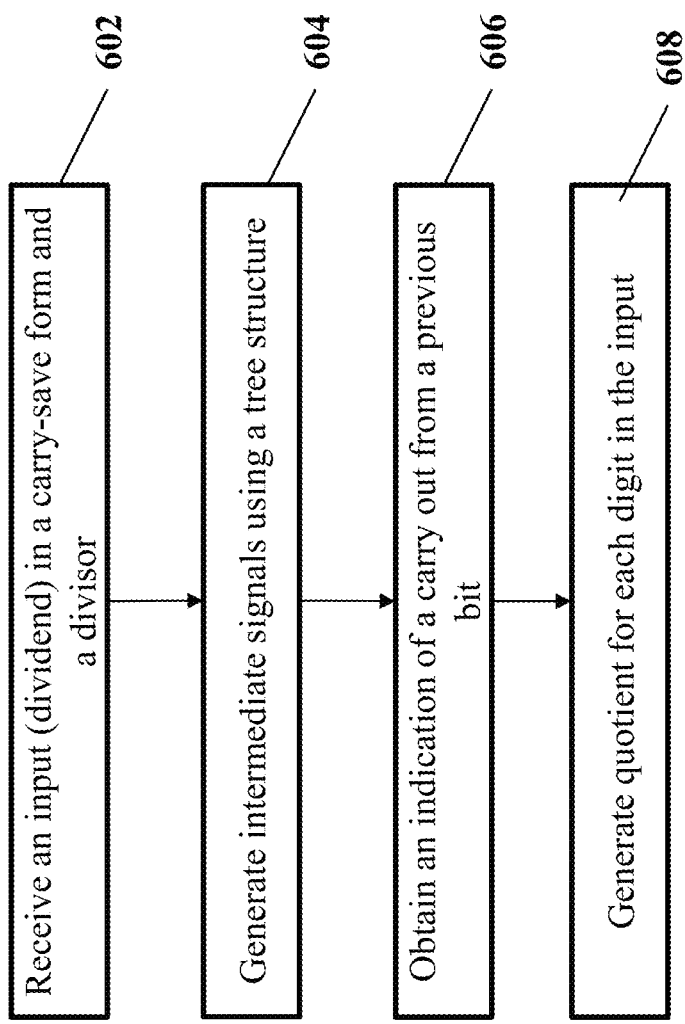
FIG. 6 shows a flow diagram of an illustrative method of performing a division of the dividend in a carry-save form by a constant, according to an embodiment.

FIG. 6 shows a flow diagram 600 of an illustrative method for generating a quotient from an input in a carry save form using a circuit architecture generated by one or more embodiments disclosed herein. Although multiple computers and multiple databases may perform the steps of the method, the steps are shown as being implemented by a single computer. Furthermore, the steps shown are merely illustrative, and additional steps or alternative steps should be considered within the scope of this disclosure. In addition, one or more of the steps may be skipped during the implementation of the method. It should also be understood that the computer may execute one or more steps in parallel.

The method may begin at step 602, where the computer may receive an input (x) to be divided (also referred to as a dividend) in a carry save form and a divisor (k). For example, the computer may receive an N-bit long input x in a carry-save form such as $x \leftrightarrow \{x_c, x_s\}$, where $x_c$ is carry portion and $x_s$ is the save portion. The divisor k may be expressed as $k=2^n \pm 1$, where n may be a positive integer.

At step 604, the computer may generate intermediate signals using a tree structure (e.g., shown in FIG. 3). The computer may define intermediate signals $R_{i,j}$ as $$R_{i,j} = (x_c[(n+1)i-1:nj] + x_s[(n+1)i-1:nj]) \bmod k.$$

Although the intermediate signals $R_{i,j}$ may depend upon the specific carry-save representation of the input x, it may be possible for the computer start from signals $R_{i,i} = (x_c[(n+1)i-1:ni] + x_s[(n+1)i-1:ni]) \bmod k$ for $0 \leq i \leq N-1$ and combine these signals using the tree structure to obtain other intermediate signals:

$$R_{N-1,i} = (x_c[MSB:ni] + x_s[MSB:ni]) \bmod k$$

for each $0 \leq i \leq N-1$. It should be understood that because $R_{N-1,i}$ depends upon the carry-save representation of the input x, $R_{N-1,i}$ may not represent a partial remainder of x. It should also be understood that $R_{N-1,i}$ may represent the partial remainder when $x_c[MSB:nl] + x_s[MSB:ni]$ is divided by k. It should further be understood that:

$$x[MSB:ni] = \begin{cases} x_c[MSB:ni] + x_s[MSB:ni] & \text{if there is no carry out from the } (ni-1)^{th} \text{ bit} \\ x_c[MSB:ni] + x_s[MSB:ni] + 1 & \text{if there is a carry out from the } (ni-1)^{th} \text{ bit.} \end{cases}$$

Therefore, the partial remainder from x[MSB:ni] may be either $R_{N-1,i}$ or $(R_{N-1,i}+1) \bmod k$, depending upon whether there is a carry-out from the $(ni-1)^{th}$ bit.

At step 606, the computer may obtain an indication of a carry out (e.g., "1" if there is a carry out and "0" if there is no carry out). Computing the signal $R_{N-1,i}$ for each i may have a longer data-path and therefore a longer delay that a carry propagate adder required to add $x_c$ and $x_s$. Therefore, without a significant extra cost (because the carry propagate adder may have much more slack than the circuitry generating $R_{N-1,i}$, the computer may obtain the signals $x_c[ni-1:(n-1)i]$ and C[ni−1] (indication of a carry out), wherein $$C[ni-1] = \begin{cases} 0 & \text{if there is no carry out from the } ni-1th \text{ bit} \\ 1 & \text{if there is a carry out from the } ni-1th \text{ bit.} \end{cases}$$

At step 608, the computer may obtain a quotient for each digit in the input. More specifically, the computer, by combining the signals $x_c[ni-1:(n-1)i]$ and C[ni−1] with $R_{N-1,i}$, may simultaneously calculate each digit of the quotient in O(1) time using the following operation:

$$q[ni-1:(n-1)i] = \frac{\{(R_{N-1,i} + C[ni-1]) \bmod k, x[ni-1:(n-1)i]\}}{k}.$$

The computer may then propagate the quotient to other parts of an integrated circuit containing aforementioned circuit architecture.

Figure 8:
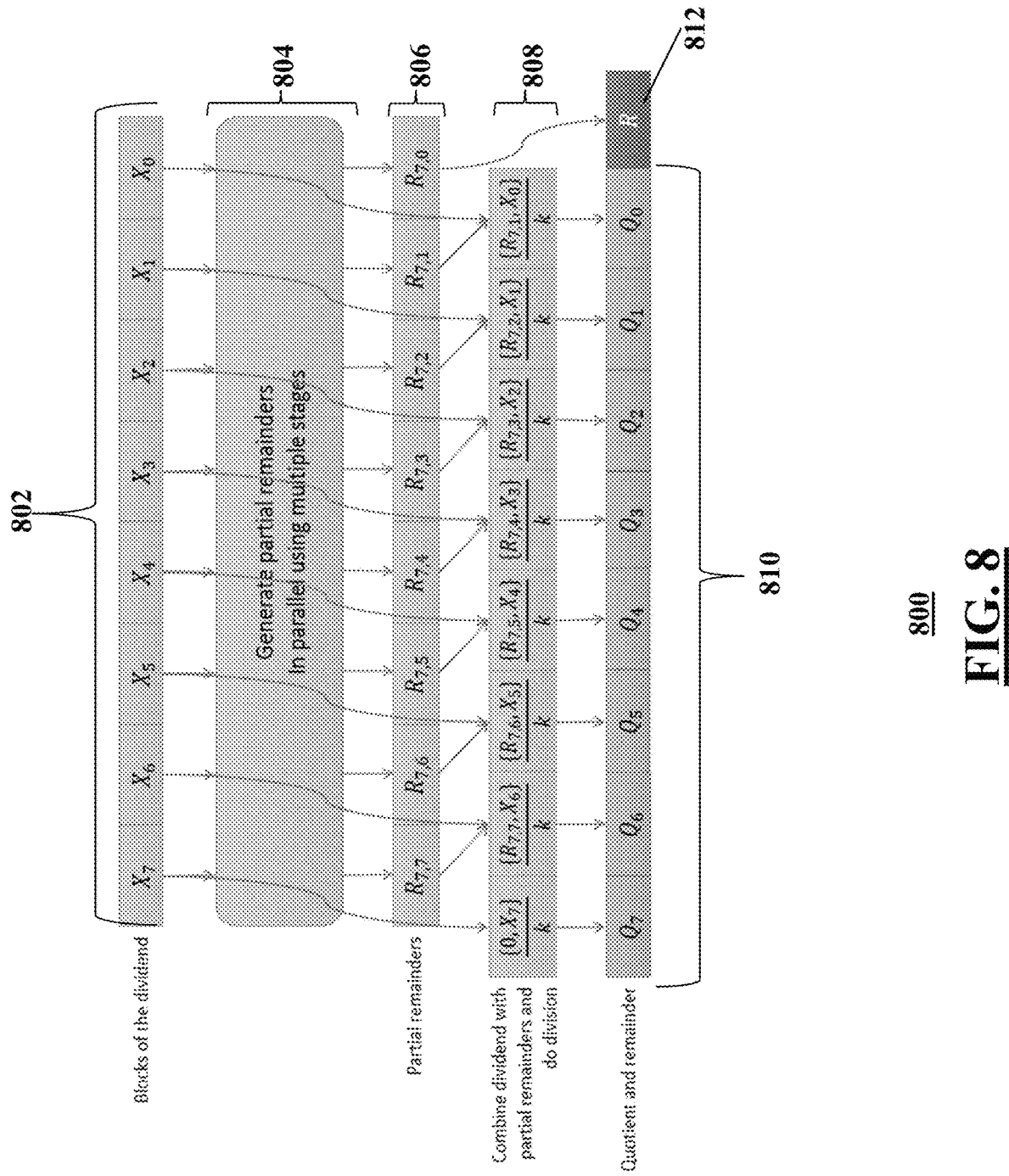
FIG. 8 shows a process diagram of an illustrative method of generating partial remainders and utilizing the partial remainders to perform a division by constant, according to an embodiment.

FIG. 8 shows a process diagram 800 of an illustrative method of performing a division by constant (k) utilizing partial remainders, according to an embodiment. Although multiple computers and multiple databases may perform the steps of the method, the steps are shown as being implemented by a single computer. Furthermore, the steps shown are merely illustrative, and additional steps or alternative steps should be considered within the scope of this disclosure. In addition, one or more of the steps may be skipped during the implementation of the method. The computer may execute the method to generate a quotient of an unsigned integer using an illustrative circuit architecture that may be faster and may have a smaller silicon footprint than conventional circuit architectures.

The computer may execute step 804 to generate partial remainders 806 in parallel using multiple stages from a dividend 802. The multiple stages of generating the partial remainders 806 may be similar to steps shown in FIG. 3 (steps 304, 306, 308, 310) and FIG. 4 (steps 408, 410, 412) with multiple parallel modulo operations. To generate the partial remainders 806, the computer may break the dividend 800 into blocks (or digits) of a predetermined size (e.g., three bit digits). As shown, the computer has divided the dividend 802 into blocks $X_7, X_6, X_5, X_4, X_3, X_2, X_1, X_0$. The partial remainders 806 generated by the computer executing step 804 may be $R_{7,7}, R_{7,6}, R_{7,5}, R_{7,4}, R_{7,3}, R_{7,2}, R_{7,1}$, and $R_{7,0}$. At step 808, the computer may combine the blocks of the dividend 802 with the partial remainders to generate a quotient 810 and a remainder 812. As shown, the quotient may contain blocks $Q_6, Q_5, Q_4, Q_3, Q_2, Q_1, Q_0$.

To generate the blocks of the quotient 810, the computer may perform the following operations at step 808: (1) $Q_7 = \{0, X_7\}/k$, (2) $Q_6 = \{R_{7,7}, X_6\}/k$, (3) $Q_5 = \{R_{7,6}, X_5\}/k$, (4) $Q_4 = \{R_{7,5}, X_4\}/k$, (5) $Q_3 = \{R_{7,4}, X_3\}/k$, (6) $Q_2 = \{R_{7,3}, X_2\}/k$, (7) $Q_1 = \{R_{7,2}, X_1\}/k$, and (8) $Q_0 = \{R_{7,1}, X_0\}/k$. The remainder 812 may be the partial remainder $R_{7,0}$.

Figure 9:
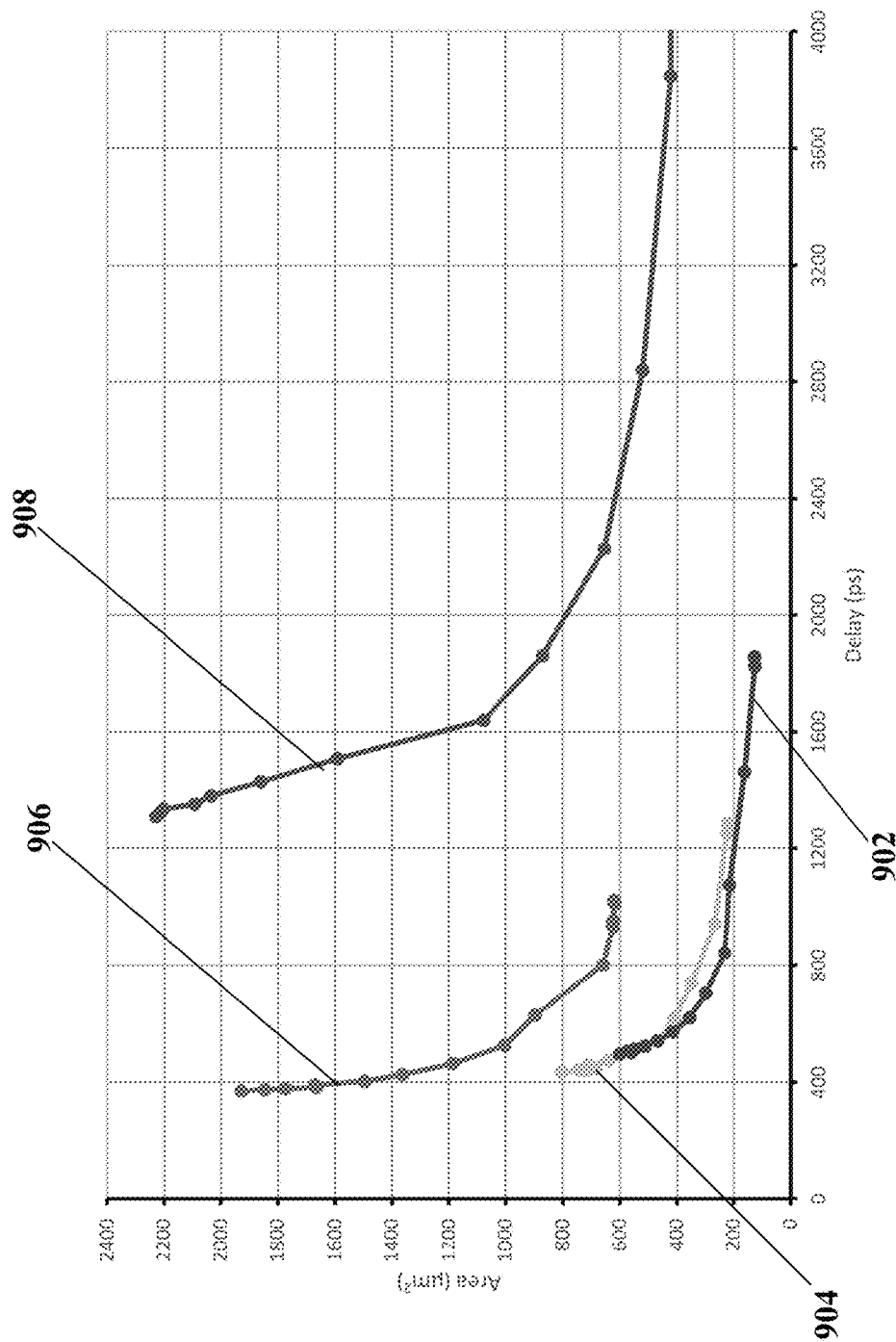
FIG. 9 shows a chart comparing the footprints of and delays associated with circuit architectures generated based on the embodiments in this disclosure and conventionally generated circuit architecture.

FIG. 9 shows a chart 900 comparing the silicone footprints and delays of various circuit architectures generated by embodiments described herein and a conventional circuit architecture. In particular the chart 900 shows graphs 902, 904, 906, 908 for a 32 bit unsigned division by a constant 17 for the different circuit architectures. Graph 902 shows silicon footprint and delay for a circuit architecture (e.g., shown in FIG. 7) performing sequential modulo operations. Graph 904 shows silicone footprint and delay for a circuit architecture (e.g., shown in FIG. 3) performing concurrent modulo operations. Graph 906 shows silicone footprint and delay for a circuit architecture (e.g., shown in FIG. 4) performing interlace modulo operations. Graph 908 shows silicone footprint and delay for a conventional circuit architecture. As seen in the chart 900, the circuit architectures generated using embodiments herein are significantly better, in terms of both delay and footprint, compared to conventional circuit architectures.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, and the like. When a process corresponds to a function, the process termination may correspond to a return of the function to a calling function or a main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of this disclosure or the claims.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the claimed features or this disclosure. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the embodiments described herein and variations thereof. Various modifications to these embodiments will be readily apparent to those skilled in the art, and the generic principles defined herein may be applied to other embodiments without departing from the spirit or scope of the subject matter disclosed herein. Thus, the present disclosure is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer implemented method comprising:
   receiving, by a computer, a hardware description file of an integrated circuit, wherein one or more data records in the hardware description file indicate a division functionality associated with a dividend and a constant divisor;
   generating, by the computer, a circuit architecture for the division functionality, wherein the circuit architecture is configured to utilize a tree structure to generate a set of intermediate signals carrying a first set of partial remainders and combine adjacent intermediate signals in the set of intermediate signals to generate a second set of partial remainders,
      wherein the circuit architecture is further configured to generate a quotient for the division functionality based upon the first and second sets of partial remainders and the digits of the dividend; and
   integrating, by the computer, the circuit architecture into a design file of the integrated circuit.

2. The method of claim 1, wherein a second set of intermediate signals carry the second set of partial remainders, wherein the circuit architecture is further configured to combine adjacent intermediate signals in the second set of intermediate signals to generate a third set of partial remainders, and wherein the circuit architecture if further configured to generate the quotient for the division functionality based upon the first, second, and third sets of partial remainders.

3. The method of claim 1, further comprising:
   generating, by the computer, a second circuit architecture for the division functionality, wherein the second circuit architecture is configured to generate bit-level remainders by zero padding the dividend on the left and utilizing multiple instances of the tree structure.

4. The method of claim 1, wherein at least one remainder in the first set of partial remainders is calculated concurrently with at least one remainder in the second set of partial remainders.

5. The method of claim 1, wherein the circuit architecture incurs a delay in the order of $O(\log_2 N)$ for the dividend having N bits.

6. The method claim 1, wherein the circuit architecture occupies a silicon area in the order of $O(N \log_2 N)$ for the dividend having N bits.

7. The method of claim 1, wherein the constant divisor is in the form of $2^m$ ($2^n\pm1$).

8. A system comprising:
a non-transitory storage medium storing a hardware description file of an integrated circuit, wherein one or more data records in the hardware description file indicate a divisional functionality associated with a signed dividend and a divisor;
a processor coupled to the non-transitory storage medium and configured to:
generate a circuit architecture for the divisional functionality, wherein the circuit architecture is configured to:
in response to the circuit architecture determining that the most significant bit of the dividend is one, replace in the dividend, zeroes with ones and ones with zeros;
utilize a tree structure to generate a set of intermediate signals carrying a first set of partial remainders;
combine adjacent intermediate signals in the set of intermediate signals to generate a second set of partial remainders;
generate a quotient for the division functionality based upon the first and second sets of partial remainders and the digits of the dividend;
in response to the circuit architecture determining that the most significant bit of the dividend is one, replace in the quotient, zeroes with ones and ones with zeros; and
integrate the circuit architecture into a design file of the integrated circuit.

9. The system of claim 8, wherein the circuit architecture is further configured to generate the quotient rounded towards negative infinity.

10. The system of claim 8, wherein the circuit architecture is further configured to add one to the quotient in response to the circuit architecture determining that the dividend is negative and that the remainder is non-zero.

11. The system of claim 10, wherein the circuit architecture is further configured to generate the quotient rounded towards zero.

12. The system of claim 8, wherein the circuit architecture is further configured to add the divisor subtracted by one to the dividend prior to generating the set of intermediate signals in response to the circuit architecture determining that the dividend is negative.

13. The system of claim 12, wherein the circuit architecture is further configured to generate quotient rounded towards zero.

14. The system of claim 8, wherein the circuit architecture includes a single incrementor in a critical path.

15. The system of claim 8, wherein at least one remainder in the first set of partial remainders is calculated concurrently with at least one remainder in the second set of partial remainders.

16. The system of claim 8, wherein a second set of intermediate signals carry the second set of partial remainders, wherein the circuit architecture is further configured to combine adjacent intermediate signals in the second set of intermediate signals to generate a third set of partial remainders, and wherein the circuit architecture if further configured to generate the quotient for the division functionality based upon the first, second, and third sets of partial remainders.

17. The system of claim 8, wherein the divisor is a constant.

* * * * *